United States Patent
Takahashi et al.

(10) Patent No.: US 7,267,812 B2
(45) Date of Patent: Sep. 11, 2007

(54) CRYSTALLINE INORGANIC POROUS MATERIAL AND PRODUCTION PROCESS THEREFOR

(75) Inventors: Ryoji Takahashi, 2-22-6-208, Nishitsuga, Wakaba-ku, Chiba-shi, Chiba 264-0026 (JP); Satoshi Sato, 1-5-12-501, Fujimi, Chou-ku, Chiba-shi, Chiba 260-0015 (JP); Akiyuki Yachi, Chiba (JP)

(73) Assignees: Tokuyama Coporation, Yamaguchi-ken (JP); Ryoji Takahashi, Chiba (JP); Satoshi Sato, Chiba (JP)

( * ) Notice: Subject to any disclaimer, the term of this patent is extended or adjusted under 35 U.S.C. 154(b) by 0 days.

(21) Appl. No.: 10/650,981

(22) Filed: Aug. 29, 2003

(65) Prior Publication Data
US 2005/0074396 A1 Apr. 7, 2005

(30) Foreign Application Priority Data
Aug. 30, 2002 (JP) .............................. 2002-253592

(51) Int. Cl.
*C01B 39/38* (2006.01)
(52) U.S. Cl. ................ 423/712; 423/705; 423/707; 423/716; 423/335; 423/DIG. 22
(58) Field of Classification Search ................ 423/712, 423/716, 709, 707, DIG. 22, 705, 335
See application file for complete search history.

(56) References Cited

U.S. PATENT DOCUMENTS

| | | | |
|---|---|---|---|
| 4,603,040 A * | 7/1986 | Kuznicki et al. | 423/712 |
| 5,976,490 A * | 11/1999 | Wendelbo | 423/712 |
| 6,004,527 A * | 12/1999 | Murrell et al. | 423/712 |
| 6,350,429 B1 | 2/2002 | Murrell et al. | |
| 6,569,400 B1 * | 5/2003 | Sterte et al. | 423/700 |
| 6,680,013 B1 * | 1/2004 | Stein et al. | 264/44 |
| 2002/0041845 A1 * | 4/2002 | Oku et al. | 423/705 |
| 2003/0147805 A1 * | 8/2003 | Koegler et al. | 423/700 |

FOREIGN PATENT DOCUMENTS

JP 62283812 A * 12/1987
WO WO 04/000730 A2 12/2003

OTHER PUBLICATIONS

Baerlocher et al., Atlas of Zeolite Framework Types, 2001.*
Hiroko Shikata et al.; Journal of Sol-Gel Science and Technology, vol. 19, pp. 769-773, 2000.

(Continued)

*Primary Examiner*—David Sample
(74) *Attorney, Agent, or Firm*—Birch, Stewart, Kolasch & Birch, LLP

(57) ABSTRACT

A crystalline inorganic porous material having two different types of pores which are macropores having a diameter in the micrometer range and micropores having a diameter in the angstrom range, at least part of the skeleton thereof having a zeolite structure. The crystalline inorganic porous material of the present invention has macropores and micropores and enables the effective transport of a substance by the macropores, thereby improving the effectiveness of the micropores of zeolite. Since a molded product can be obtained without using a binder, the selectivity of a reaction of interest can be improved in an acidic catalytic reaction or precision separation in adsorption/separation becomes possible.

6 Claims, 9 Drawing Sheets

OTHER PUBLICATIONS

Kazuki Nakanishi; Journal of Porous Materials, vol. 4, pp. 67-112, 1997.
Ryoji Takahashi et al.; Journal of the Ceramic Society of Japan, vol. 109, No. 7, pp. 577-579, 2001.
Ryoji Takahashi et al.; Journal of Catalysis, vol. 200, pp. 197-202, 2001.
Masahiko Matsukata et al.; Functional Materials, No. 10, vol. 20, pp. 64-73 (2000).
D.H. Olson et al.; Journal of Physical Chemistry, vol. 85, No. 15, Jul. 23, 1981, pp. 2238-2243.
K.S.W. Sing et al.; Pure and Applied Chemistry, vol. 57, No. 4, 1985, pp. 603-619.

* cited by examiner

US 7,267,812 B2

CRYSTALLINE INORGANIC POROUS MATERIAL AND PRODUCTION PROCESS THEREFOR

This nonprovisional application claims priority under 35 U.S.C. § 119(a) on Patent Application No(s). 2002-253592 filed in JAPAN on Aug. 30, 2002, which is(are) herein incorporated by reference.

FIELD OF THE INVENTION

The present invention relates to a crystalline inorganic porous material. More specifically, it relates to a crystalline inorganic porous material having two different types of pores which are macropores and micropores and to a production process therefor. The crystalline inorganic porous material of the present invention is suitably used as a material for solid catalysts, catalytic carriers, adsorbents and separators.

PRIOR ART

Zeolites are crystalline porous materials having micropores on the order of angstrom and those having various crystal systems are known as natural minerals. Some of them can be synthesized from a solution containing silicon and aluminum. The structure of the micropores of zeolite corresponds to its crystal system and shows selective adsorption and separation behaviors according to its molecular sieving effect. It is known that silica-alumina-based zeolite whose cations have been converted into protons by ion exchange shows strong acidity and is used as an important acidic catalyst in the petrochemical industry.

Zeolite can be synthesized by adding an additive such as an alkylamine to a solution containing silicon and aluminum and aging the resulting solution. The thus obtained zeolite is in the form of a fine powder and must be sintered together with a binder such as an alumina slurry before use.

For practical application to catalysts and the like, as the diffusion rate of molecules in the micropores of zeolite is often restricted, some measure must be taken to improve the transport of a substance contained in a molded product of zeolite. Since alumina as a binder to be added during molding may have a bad influence upon a catalytic function, importance is attached to the development of a binder-free molding technique. Therefore, a dry gel conversion method is used to produce a zeolite molded product by binder-free molding (Functional Materials No. 10, Vol. 20, 64-73, 2000). However, the above method merely controls the size of the micropores of the zeolite molded product and is unsatisfactory in terms of the improvement of transport of a substance. The dry gel conversion method is a zeolite synthesis method in which a dry gel containing a structure-directing agent is treated under the pressure of steam. The term "structure-directing agent" as used herein is a general term for additives such as organic ammonium compounds and organic amines having structural derivation, control, promoting and structure determining functions to convert silica and silica-alumina into a crystalline zeolite structure.

For example, attempts are being made to selectively dissolve a low crystallinity portion by the alkali treatment of zeolite in order to introduce nanopores into zeolite. However, this method is effective in improving the transport of a substance contained in each crystal but is not suitable in improving the transport of a substance contained in a molded product.

Also, attempts are being made to deposit a silicalite crystal in the pores of the silica molded product having macropores produced by a sol-gel method (Journal of Sol-Gel Science and Technology, 19, 769-773, 2000). Silica used herein is obtained by adding a polymer compound in order to optimize composition and gelation conditions in the production of silica by a sol-gel method using silicon alkoxide. The structure of the macropores of the silica is determined when the transient structure of phase separation caused by induced spinodal decomposition is frozen by gelation. The structure of the nanopores of the thus produced silica can be also controlled. When silicalite is synthesized using the macropores of this silica as a reaction site, a porous material having silicalite crystals dispersed in its macropores is obtained. However, if the original silica does not have nanopores, the crystallization and crystal growth of the silica skeleton will not proceed and it is apprehended that the existence of the nanopores will exert a bad influence upon the function of the material while it is in use. No attempts are being made to produce crystalline zeolite other than silicalite.

SUMMARY OF THE INVENTION

The inventors of the present invention have conducted studies on a porous material having fully controlled macropores and a zeolite skeleton. Currently, zeolite having a plurality of controlled pores is unknown. It is an object of the present invention to provide a novel crystalline inorganic porous material having two different types of pores which are macropores and micropores.

That is, according to the present invention, the above object of the present invention is attained by a crystalline inorganic porous material having two different types of pores which are macropores having a diameter of a micrometer range and micropores having a diameter of an angstrom range, at least part of the skeleton thereof having a zeolite structure. Further, according to the present invention, the above object is attained by a process for producing a crystalline inorganic porous material, comprising subjecting amorphous porous silica or amorphous porous silica-alumina to a hydrothermal treatment or steam treatment in the presence of a structure-directing agent and optionally an aluminum source.

DETAILED DESCRIPTION OF THE PREFERRED EMBODIMENT

Figure 1:
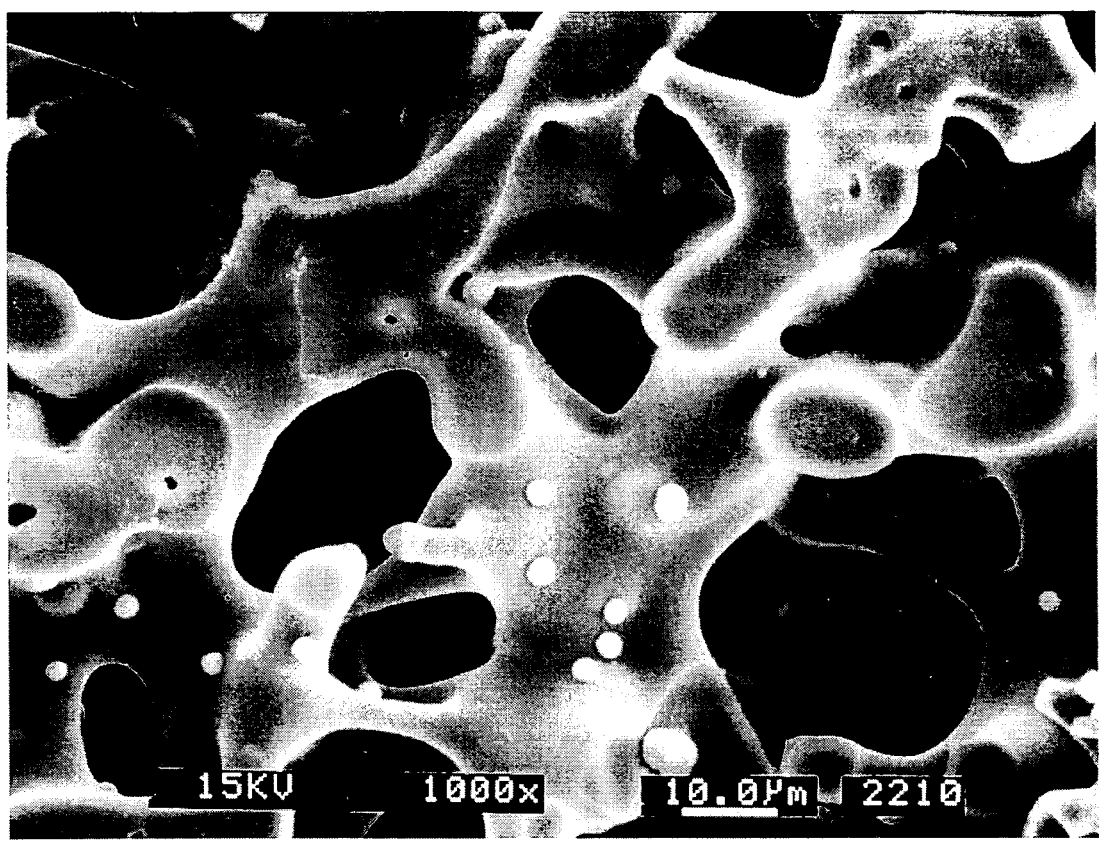
FIG. 1 is a SEM photograph showing the pore state of amorphous porous silica used as a raw material in Example 1.

The term "crystalline inorganic porous material" of the present invention is a general term for structures having a so-called crystalline zeolite structure. The crystalline inorganic porous material is porous zeolite containing $[AlO_4]^{5-}$ and $[SiO_4]^{4-}$ as the basic units of crystals. This crystalline inorganic porous material also includes silicalite having a crystalline zeolite structure without the $[AlO_4]^{5-}$ unit. The porous zeolite of the present invention includes porous zeolite having a $[Al_2O_3]/[SiO_2]$ molar ratio of 0. This molar ratio is generally 0.2 or less, particularly preferably 0 to 0.1 from the viewpoint of practical applicability.

The cation which is the other component of zeolite may be an alkali metal or alkali earth metal ion such as sodium, potassium, calcium or magnesium, or ammonium ion or alkylammonium ion at the time of preparation and can be converted into a proton by baking or ion exchange.

Part or all of the skeleton of the crystalline inorganic porous material of the present invention has a zeolite structure typified by an MFI structure. As will be described hereinafter, when the crystalline inorganic porous material is used in an adsorbing and separating material or a special catalyst, all the skeleton of the crystalline inorganic porous material does not need to have a zeolite structure. If the surface portion of each macropore (pore wall) has a zeolite structure, the characteristic properties of the zeolite structure can be fully obtained.

The above crystalline zeolite structure can be confirmed by using analytical means such as the SEM observation of a broken-out section, X-ray diffraction and adsorption measurement in combination.

The biggest feature of the crystalline inorganic porous material of the present invention is that it has substantially two different types of pores which are macropores having a diameter of a micrometer range and micropores having a diameter of an angstrom range.

A crystalline inorganic porous material having nanopores having a diameter of a nanometer range, specifically 2 to 30 nm, in addition to the above two different types of pores, can also be produced.

The diameters of the macropores generally range from 0.5 to 30 μm, which can be controlled to a desired value with a narrow (sharp) pore size distribution.

The diameters of the micropores which are determined by crystal system generally range from 3 to 20 Å with a sharp pore size distribution.

These pores are existent with a pore size distribution with a specific pore size as the center, which is commonly seen in porous materials. The crystalline inorganic porous material of the present invention is characterized in that its macropores have high continuity and large volume. The volume of the macropores can be controlled to a range of 0.3 to 2 cm$^3$/g. Macropores having a volume of about 1 cm$^3$/g are easily formed.

Although a method of mercury penetration is used to measure the volume and pore size distribution of macropores, the pore diameter and the continuity of the pores can be confirmed by direct SEM observation. The pore diameter and pore size distribution of micropores can be determined from the spatial sequence of atoms of the crystal structure determined by X-ray diffraction and the volume of the micropores can be obtained by a nitrogen adsorption method.

Although the process for producing the crystalline inorganic porous material of the present invention is not particularly limited, the crystalline inorganic porous material can be produced by the following typical process.

Amorphous porous silica is first produced by a process making use of phase separation. This porous silica can be produced by processes known per se, for example, processes disclose by J. Porous Materials, 4, 67-112 (1997) and Journal of the Ceramic Society of Japan, 109[7]577-579 (2001).

The pore size and volume of the macropores can be controlled by the production conditions of this porous silica. This porous silica is subjected to a hydrothermal treatment or steam treatment in the presence of a structure-directing agent (to be abbreviated as SDA hereinafter) such as alkylammonium required for the formation of crystals to convert the skeleton of the macropores into zeolite crystals. In the production of zeolite crystals containing aluminum, an aluminum source may be existent at the time of producing silica, added by impregnation before addition of SDA after the formation of silica, or added together with SDA.

Porous silica or porous silica-alumina used as a raw material is preferably baked in advance to remove an organic additive such as a water soluble polymer compound which is added to form macropores and improve strength. The baking temperature is generally 500 to 1,0000° or may be 500° C. or lower.

The SDA must be added to the porous silica to carry out crystallization of interest. Examples of SDA include quaternary alkylammonium hydroxides such as tetra-(n-propyl) ammonium hydroxide and tetraethylammonium hydroxide, and halides thereof. The amount of SDA is suitably determined in consideration of the crystallinity of the crystalline inorganic porous material. In general, a 0.1 to 10 wt % aqueous solution (preferably 1 to 5 wt % aqueous solution) of SDA is prepared and added to porous silica by a single time of immersion. About 1 to 2 wt % of an alkali hydroxide such as sodium hydroxide is added to this aqueous solution. The alkali to be added such as sodium hydroxide has the effect of promoting crystallization and the effect of controlling the charge compensation of aluminum cation and the crystal structure in the crystallization of a silica-alumina system.

The temperature of the immersion operation is not particularly limited and may be room temperature. The time of the immersion operation is several seconds to 1 hour. Air bubbles in the pores can be completely substituted with the SDA aqueous solution by optional depressurization.

Thereafter, the porous silica is optionally dried. The drying temperature is room temperature to 100° C. and the drying time is 12 to 24 hours.

The porous silica to which SDA has been added is converted into zeolite crystals by a hydrothermal treatment or steam treatment.

To produce silicalite having a zeolite structure, the above SDA-added porous silica may be directly converted. To produce an aluminum-containing zeolite crystal, an aluminum source must be presented before conversion. The time of presenting the aluminum source is not particularly limited, and the aluminum source may be existent at the time of producing porous silica or may be presented together with SDA which has been described above. Stated more specifically, aluminum nitrate is existent during the gelation of silicon alkoxide to produce amorphous silica-alumina having a controlled pore structure and then to be used as a substitute for porous silica (J. Catal, 200, 197-202 (2001)).

The aluminum source is a water-soluble salt such as aluminum nitrate or aluminum chloride. An alkoxide such as aluminum isopropoxide or aluminum sec-butoxide may also be used. The amount of the aluminum source may be suitably determined by the desired crystal system of crystalline zeolite and the $[Al_2O_3]/[SiO_2]$ molar ratio which is the best suited for application of interest.

The hydrothermal treatment or steam treatment method is not particularly limited and a typical method is described below.

In the case of a hydrothermal treatment, a Teflon (registered trademark) inner tube is placed in a stainless steel airtight pressure container and porous silica which has been immersed in an aqueous solution containing SDA is injected into this tube. This container is set in an oven heated at 100 to 200° C., preferably about 150° C. for several hours to one week, preferably 1 to 3 days. When a glass or metal inner tube is used, the elution of an impurity from the container during the treatment and the entry of the impurity into a sample must be taken into consideration. When another plastic inner tube is used, its heat resistance must be taken into consideration.

In the case of a steam treatment, a similar device is prepared and porous silica which has been immersed in an aqueous solution containing SDA and dried is placed in the device. Water is added to the device in an amount required to fill the inside of the container with saturation steam and not to contact the porous silica. This container is left under the same conditions as the hydrothermal treatment.

In this steam or hydrothermal treatment, the formed crystal system is changed by the type of SDA, the $[Al_2O_3]/[SiO_2]$ molar ratio and the alkali concentration, and the crystallinity is changed by the amount of SDA and the treatment time. The diameters of the micropores are controlled by the variation of the crystal system and the volumes of the pores are changed by crystallinity. The diameters of the macropores and the diameters of the nanopores of the porous silica which is a starting material have an influence upon the behavior of crystallization. Therefore, by suitably changing these conditions, a crystalline inorganic porous material having a desired crystal system, micropore size and pore volume is obtained.

Although the strength of the obtained crystalline inorganic porous material of the present invention may slightly lower according to the degree of crystal growth, a porous silica molded product can be produced while its original shape is retained. As for the internal structure, the existence of macropores and micropores and the confirmation of the zeolite structure can be confirmed by the above analytical means.

EXAMPLES

The following examples are given to further illustrate the present invention.

Example 1

A silica gel having macropores with a diameter of 10 μm and nanopores with a diameter of 2.5 nm was manufactured from tetraethoxysilane (to be abbreviated as TEOS hereinafter) in the presence of polyethylene oxide (to be abbreviated as PEO hereinafter) having a molecular weight of 100,000. As for the composition of the silica gel at the time of preparation, the weight ratio of water, concentrated nitric acid, PEO and TEOS was 11.5:1.1:0.8:9.3. These raw materials were stirred at room temperature to prepare a homogeneous solution, the resulting solution was then left at 50° C. to be geled, and the gel was dried at 50° C. and baked at 600° C.

This silica gel was impregnated with an aqueous solution having 5 wt % of tetrapropylammonium hydroxide (to be abbreviated as TPA hereinafter) comprising 0.02 g of sodium hydroxide, 1.2 g of an aqueous solution having 10 wt % of TPA and 1.2 g of water, and subjected to a steam treatment in a Teflon (registered trademark) airtight container at 150° C. for 3 days.

Figure 2:
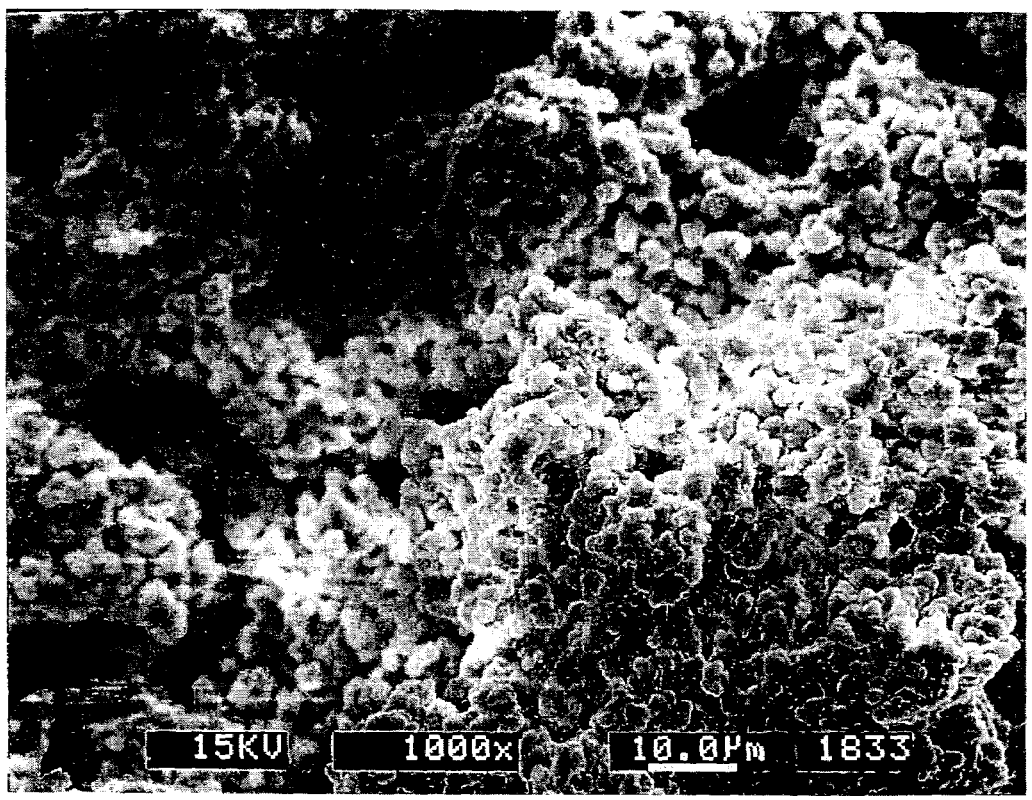
FIG. 2 is a SEM photograph showing the pore state of the crystalline inorganic porous material of the present invention obtained in Example 1.
Figure 3:
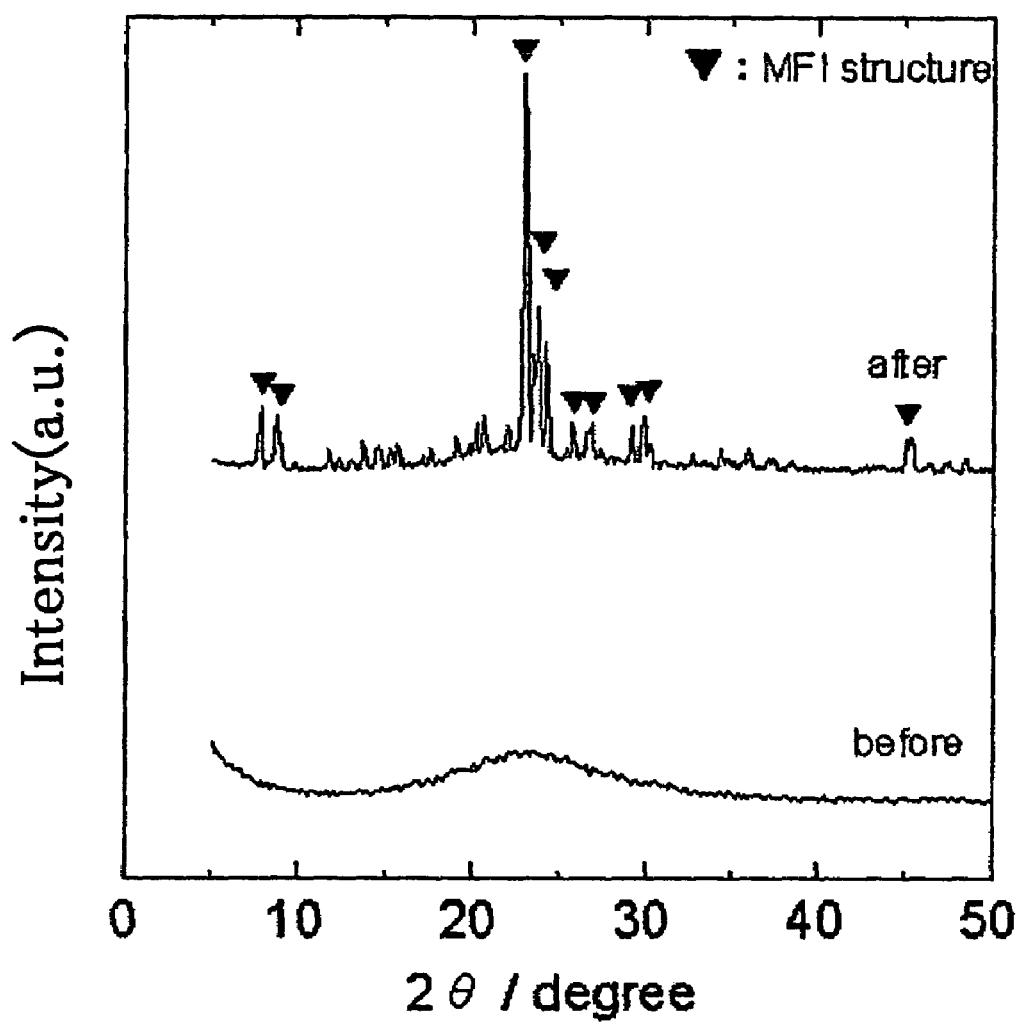
FIG. 3 is an X-ray diffraction diagram of the crystalline inorganic porous material of the present invention obtained in Example 1.

FIG. 1 and FIG. 2 are SEM photos of the section of a sample before and after this treatment. It is understood from comparison between these photos that the skeleton of silica having a smooth surface is changed to an assembly structure of particles as large as 1 μm. In spite of this structural change, the silica gel retained its original form as a formed product. FIG. 3 is an X-ray diffraction diagram of silica before and after the steam treatment. According to the figure, silica was amorphous before the treatment and became crystalline with an MFI structure after the treatment. That is, it could be confirmed that the thus grown particles were zeolite having an MFI structure, that is, silicalite-1.

It could be confirmed by nitrogen adsorption measurement that nanopores existent before the treatment disappeared completely after the treatment and only micropores (as large as 20 Å or less) derived from zeolite crystals were existent. It was found that this silica had a bimodal structure having pores on the order of micrometer and pores on the order of angstrom in addition to the macropores observed through SEM (about 10 μm). The crystallinity was estimated at about 50% from the intensity of XRD diffraction and the amount of nitrogen adsorbed.

Figure 4:
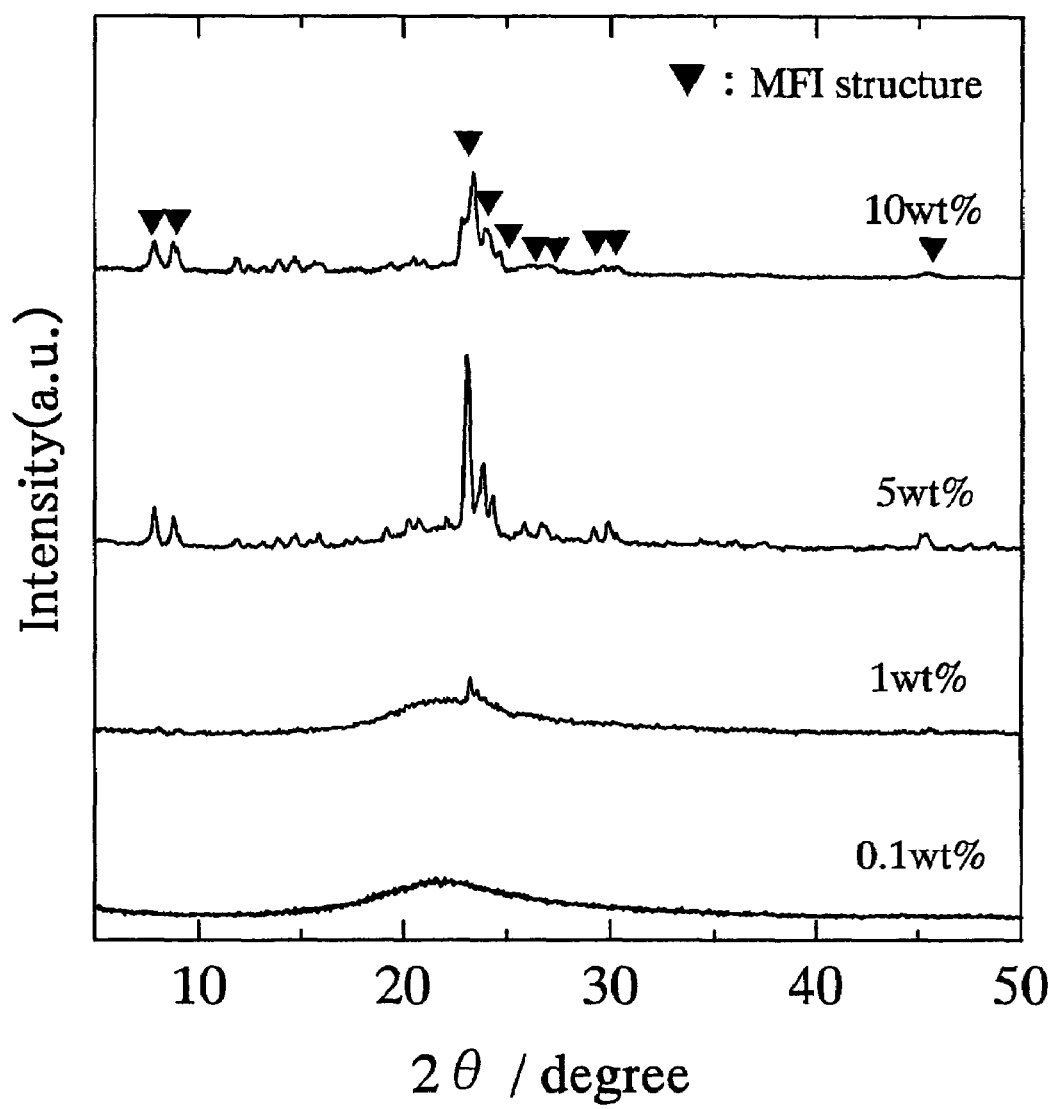
FIG. 4 is an X-ray diffraction diagram obtained when the TPA concentration during a steam treatment is changed in the production of the crystalline inorganic porous material of the present invention obtained in Example 1.

It could be confirmed that when the TPA concentration at the time of the steam treatment was changed, the peak strength of MFI crystals observed by X-ray diffraction rose as the concentration increased. FIG. 4 is an X-ray diffraction diagram when the TPA concentration is changed during a steam treatment. It was also confirmed that the diffraction intensity increased as the steam treatment time became longer, which means that crystal growth proceeded along with the passage of time. The variation of diffraction intensity became small and almost constant when the TPA concentration was 3.3 wt % or more and the treatment time was 3 days or longer.

Figure 5:
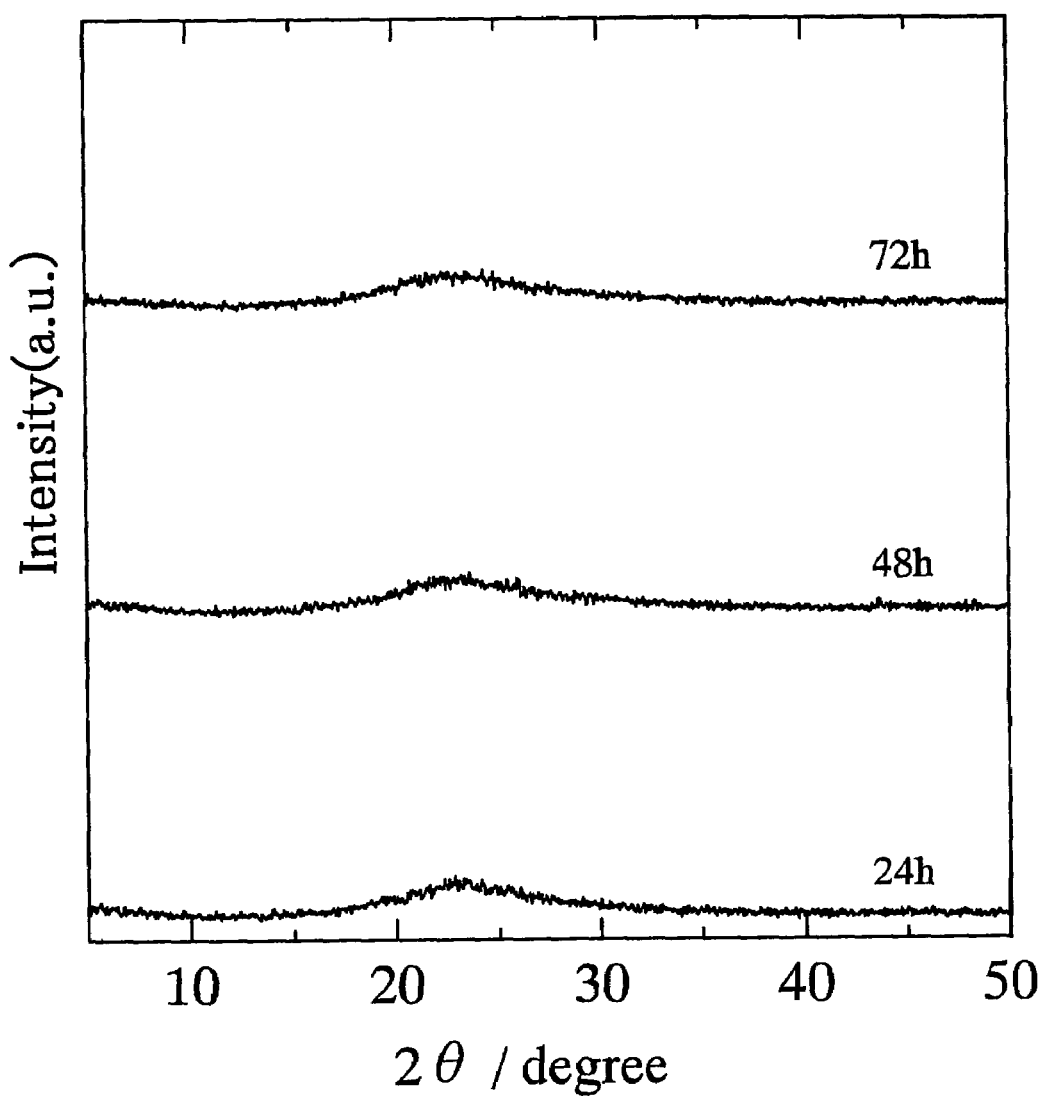
FIG. 5 is an X-ray diffraction diagram obtained when the steam treatment temperature is 80° C. and the treatment time is changed in the production of the crystalline inorganic porous material of the present invention obtained in Example 1.
Figure 6:
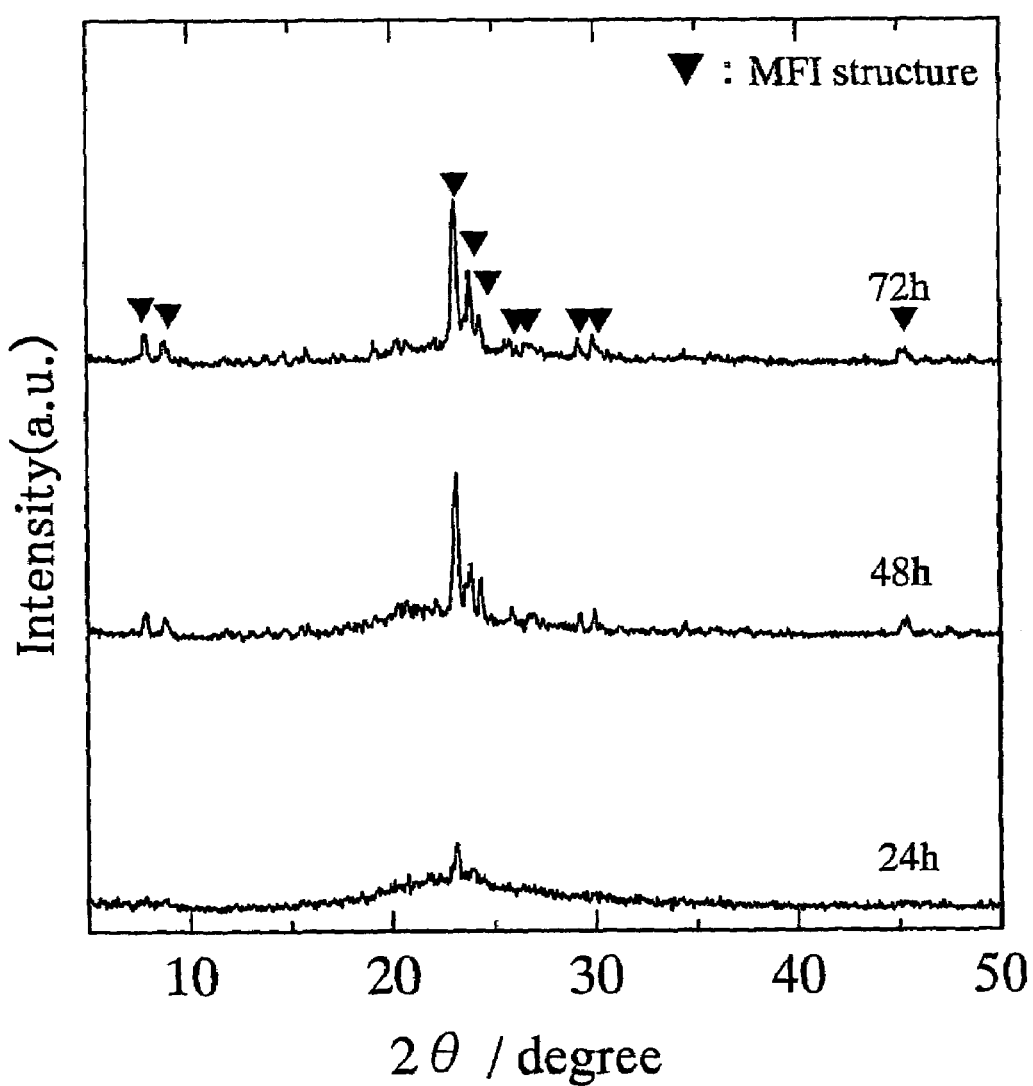
FIG. 6 is an X-ray diffraction diagram obtained when the steam treatment temperature is 110° C. and the treatment time is changed in the production of the crystalline inorganic porous material of the present invention obtained in Example 1.
Figure 7:
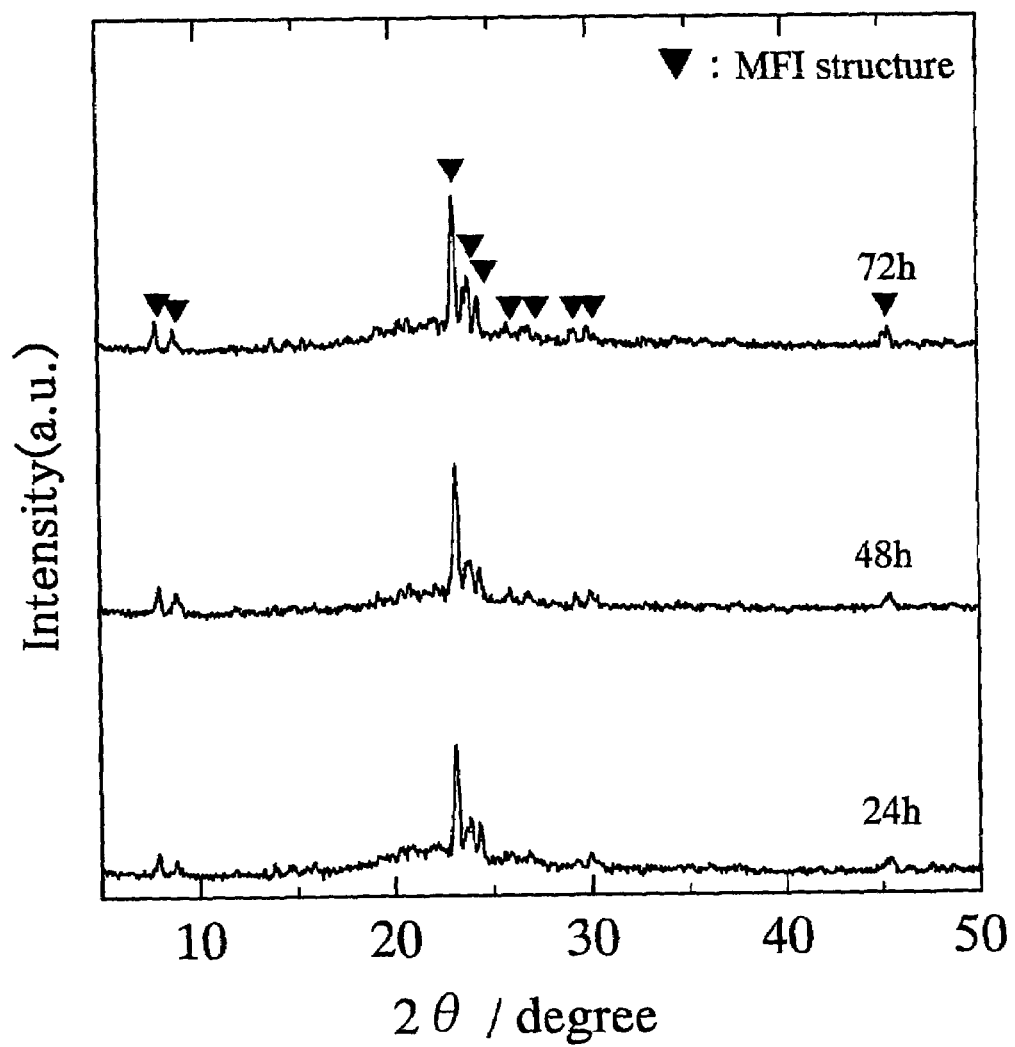
FIG. 7 is an X-ray diffraction diagram obtained when the steam treatment temperature is 150° C. and the treatment time is changed in the production of the crystalline inorganic porous material of the present invention obtained in Example 1.
Figure 8:
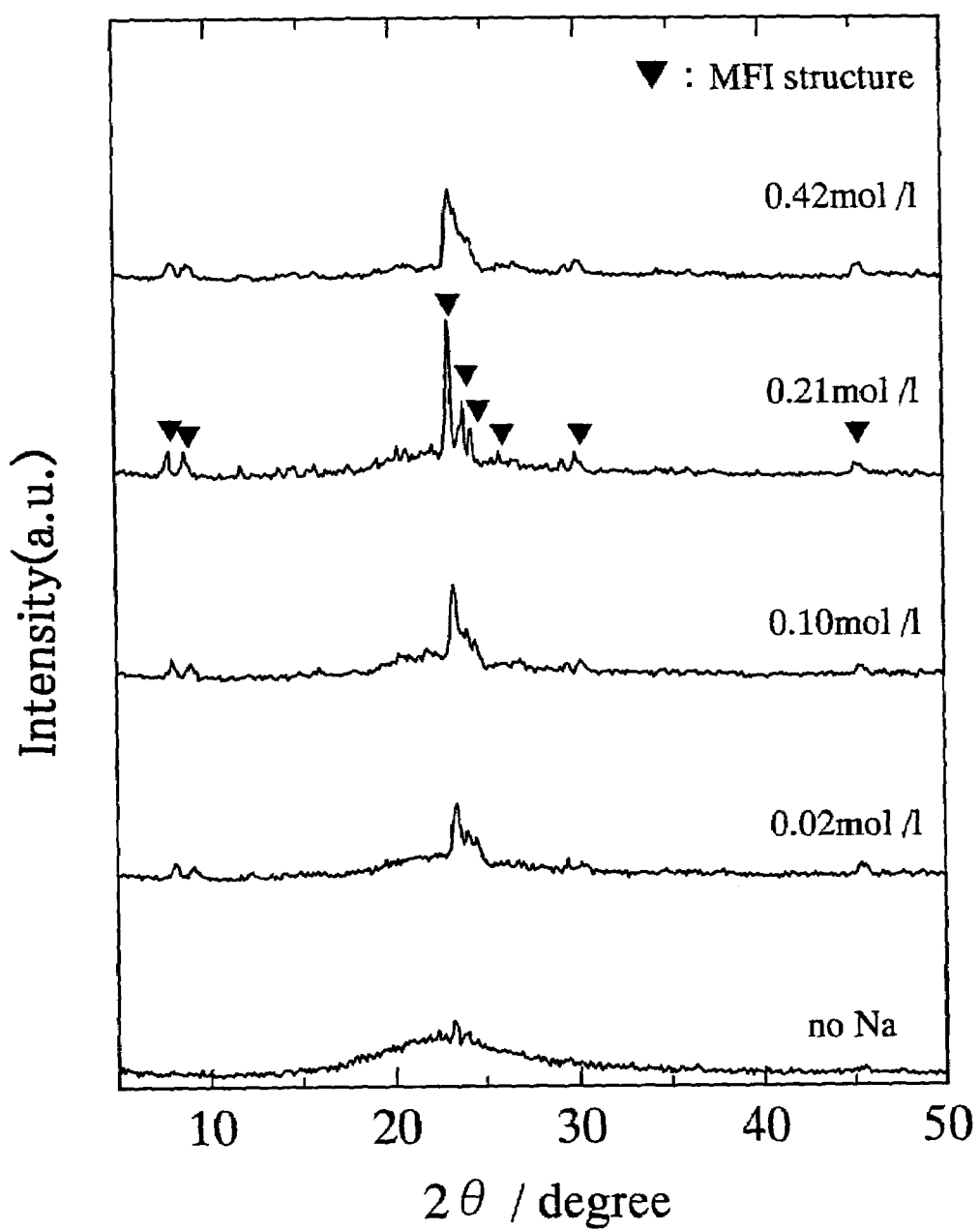
FIG. 8 is an X-ray diffraction diagram obtained when the alkali concentration is changed in the production of the crystalline inorganic porous material of the present invention obtained in Example 1.

FIGS. 5, 6 and 7 are X-ray diffraction diagrams when the steam treatment time is changed. According to these figures, crystallization does not occur at 80° C. within 3 days, crystals grow at 110° C. along the passage of time, crystallization proceeds fast at 160° C. in almost a day and rarely changes after that. FIG. 8 is an X-ray diffraction diagram when the alkali concentration is changed. It can be confirmed from this figure that as the alkali concentration increases, the intensity of diffraction rises and crystallization proceeds.

Example 2

Amorphous silica-alumina containing 5 wt % of alumina was used in place of silica used for the steam treatment in Example 1. The amorphous silica-alumina was manufactured by dissolving $Al(NO_3)_3 \cdot 9H_2O$ in a mixture of water and NaOH having a concentration of 0.1 mol/l and adding concentrated nitric acid, PEO having a molecular weight of 100,000 and TEOS to prepare a homogenous solution, leaving the resulting solution at 50° C. to gel it, drying the gel at 50° C. and baking it at 600° C. The obtained amorphous silica-alumina was impregnated with an aqueous solution 5 wt % of TPA comprising 0.02 g of sodium hydride, 1.2 g of an aqueous solution having 10 wt % of TPA and 1.2 g of water and subjected to a steam treatment in the same manner as in Example 1. Also in this case, the diffraction of crystals having an MFI structure was confirmed and the formation of zeolite ZSM-5 was verified.

Only micropores (as large as 20 Å or less) derived from zeolite crystals could be confirmed by nitrogen adsorption measurement and macropores (as large as about 10 μm) were observed through SEM. It was found that the obtained silica-alumina had a bimodal structure having pores on the order of micrometer and pores on the order of angstrom.

Example 3

A silica formed product having two different types of pores obtained in Example 1 was immersed in a TPA aqueous solution, deaerated in vacuum to substitute air bubbles in pores with the TPA aqueous solution, and dried. As a result, it was observed that the whole silica skeleton was crystallized.

Example 4

A silica gel having macropores with a diameter of 10 μm and nanopores with a diameter of 8 nm was prepared from water glass (JIS No. 3) in the presence of polyacrylic acid (HPAA) having a molecular weight of 25,000. As for the composition of the gel at the time of preparation, the weight ratio of water, concentrated nitric acid, HPAA and water glass was 97:37:6.5:60. These raw materials were stirred at room temperature to prepare a homogeneous solution, the resulting solution was left at 25° C. to be geled, and the gel was dried and baked. This silica gel was impregnated with an aqueous solution having 5 wt % of TPA comprising 0.02 g of sodium hydroxide, 1.2 g of an aqueous solution having 10 wt % of TPA and 1.2 g of water, and subjected to a steam treatment in a Teflon airtight container at 150° C. for 2 days.

The sample after the treatment had an assembly structure of particles as large as about 1 μm while the silica skeleton retained its original form before the treatment as in Example 1. It was confirmed by X-ray diffraction that the sample was zeolite having an MFI structure, that is, silicalite-1.

Only micropores (as large as 20 Å or less) derived from zeolite crystals could be confirmed by nitrogen adsorption measurement and macropores (as large as about 10 μm) were observed through SEM. It was found that the obtained zeolite had a bimodal structure having pores on the order of micrometer and pores on the order of angstrom.

Example 5

A silica gel having macropores with a diameter of 10 μm and nanopores with a diameter of 6 nm was prepared from water glass (JIS No. 3) in the presence of polyacrylic acid (HPAA) having a molecular weight of 25,000. As for the composition of the gel at the time of preparation, the weight ratio of water, concentrated nitric acid, HPAA and water glass was 97:37:6.5:60. These raw materials were stirred at room temperature to prepare a homogeneous solution, the resulting solution was left at 25° C. to be geled, and the gel was dried, impregnated with an aluminum nitrate solution and baked. The obtained amorphous silica-alumina was impregnated with an aqueous solution having 5 wt % of TPA comprising 0.02 g of sodium hydroxide, 1.2 g of an aqueous solution having 10 wt % of TPA and 1.2 g of water, and subjected to a steam treatment in a Teflon airtight container at 150° C. for 2 days.

The sample after the treatment had an assembly structure of particles as large as about 1 μm while the silica skeleton retained its original form before the treatment as in Example 1. It was confirmed by X-ray diffraction that the sample had an MFI structure.

Figure 9:
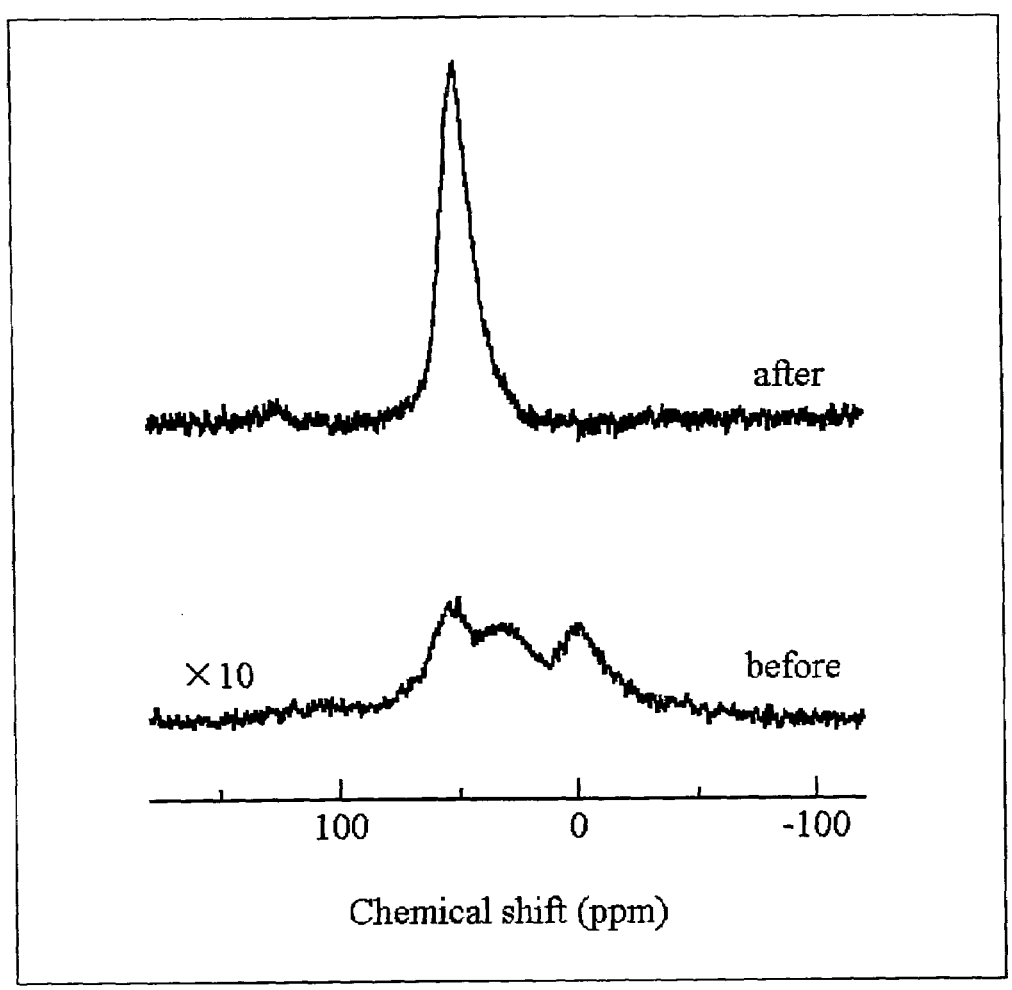
FIG. 9 is a $^{27}$Al MAS NMR spectral diagram of the crystalline inorganic porous material of the present invention obtained in Example 5.

FIG. 9 shows the $^{27}Al$ MAS NMR spectrum of the sample after the steam treatment. The silica-alumina gel before the treatment was amorphous, its spectral intensity was low, and the existence of aluminum atoms at the 4, 5 and 6 coordination positions was confirmed. After the steam treatment, the spectral intensity rose to 10 times and it could be confirmed that all the aluminum atoms were existent at the 4 coordination position. This is because all the aluminum atoms were introduced into the zeolite skeleton and zeolite having an MFI structure was ZSM-5.

Only micropores (as large as 20 Å or less) derived from zeolite crystals could be confirmed by nitrogen adsorption measurement and macropores (as large as about 10 μm) were observed through SEM. It was found that the obtained zeolite had a bimodal structure having pores on the order of micrometer and pores on the order of angstrom.

EFFECT OF THE INVENTION

The crystalline inorganic porous material of the present invention has macropores and micropores and enables the effective transport of a substance by the macropores, thereby improving the effectiveness of the micropores of zeolite. Since a molded product can be obtained without using a binder, the selectivity of a reaction of interest can be improved in an acidic catalytic reaction or precision separation in adsorption/separation becomes possible.

What is claimed is:

1. A crystalline inorganic porous material having two different types of pores which are (i.) macropores having a diameter of 0.5 to 30 μm and (ii.) micropores having a diameter of 3 to 20 Å, said crystalline inorganic porous material having a skeleton, at least part of the skeleton thereof having a zeolite structure, at least a portion of the macropores existing as continuous through holes.

2. The crystalline inorganic porous material of claim 1, wherein the zeolite structure is composed of $Al_2O_3$ and $SiO_2$ in a molar ratio $[Al_2O_3]/[SiO_2]$ of 0 to 0.2.

3. The crystalline inorganic porous material of claim 1 which is silicalite having an MFI structure.

4. The crystalline inorganic porous material of claim 1 which is zeolite having an MFI structure.

5. A process for producing a crystalline inorganic porous material having two different types of pores which are (i.) macropores having a diameter of 0.5 to 30 μm and (ii.) micropores having a diameter of 3 to 20 Å, said crystalline inorganic porous material having a skeleton, at least part of the skeleton thereof having a zeolite structure, at least a portion of the macropores existing as continuous through holes, said process comprising subjecting amorphous porous silica or amorphous porous silica alumina to a hydrothermal treatment or steam treatment at a temperature of from 100 to 200° C. for a period of from 1 to 3 days in the presence of a structure-directing agent and optionally an aluminum source.

6. The process for producing the crystalline inorganic porous material according to claim 5, wherein the structure-directing agent is a quaternary alkylammonium hydroxide or halide thereof.

* * * * *